(12) United States Patent
Murata et al.

(10) Patent No.: US 6,618,116 B1
(45) Date of Patent: Sep. 9, 2003

(54) OPTICAL HEAD DEVICE AND A DIFFRACTION ELEMENT SUITABLE FOR THE DEVICE, AND A METHOD OF MANUFACTURING THE DIFFRACTION ELEMENT AND THE OPTICAL HEAD DEVICE

(75) Inventors: Koichi Murata, Yokohama (JP); Hiromasa Sato, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/509,532

(22) PCT Filed: Oct. 1, 1998

(86) PCT No.: PCT/JP98/04445

§ 371 (c)(1),
(2), (4) Date: Mar. 31, 2000

(87) PCT Pub. No.: WO99/18459

PCT Pub. Date: Apr. 15, 1999

(30) Foreign Application Priority Data

Oct. 2, 1997 (JP) .............................................. 9-270124
Jan. 26, 1998 (JP) ............................................ 10-012817

(51) Int. Cl.⁷ ................................................ G02F 1/13
(52) U.S. Cl. ...................................................... 349/201
(58) Field of Search ......................................... 349/201

(56) References Cited

U.S. PATENT DOCUMENTS

| 4,251,137 A | * | 2/1981 | Knop et al. .................. 349/201 |
| 4,822,146 A | * | 4/1989 | Yamanobe et al. .......... 349/201 |
| 4,850,681 A | * | 7/1989 | Yamanobe et al. .......... 349/201 |
| 5,245,471 A | * | 9/1993 | Iwatsuka et al. ............. 359/494 |
| 6,304,312 B1 | * | 10/2001 | Tanabe et al. ............... 349/201 |

FOREIGN PATENT DOCUMENTS

| JP | 62-71905 | 4/1987 |
| JP | 63-26604 | 2/1988 |
| JP | 63-262602 | 10/1988 |
| JP | 63-503102 | 11/1988 |
| JP | 2-156205 | 6/1990 |
| JP | 5-289027 | 11/1993 |
| JP | 6-242315 | 9/1994 |
| JP | 9-50642 | 2/1997 |
| JP | 9-102138 | 4/1997 |
| JP | 9-292520 | 11/1997 |
| JP | 10-62615 | 3/1998 |
| JP | 10-142419 | 5/1998 |

* cited by examiner

Primary Examiner—James Dudek
(74) Attorney, Agent, or Firm—Oblon, Spivak, McClelland, Maier & Neustadt, P.C.

(57) ABSTRACT

In order to read out information even from an optical recording medium having birefringence, of a diffracting element comprising an optical material forming a diffraction grating 21 having a cross-sectional shape of projections and recesses, and another optical material 22 filled at least in the recesses of the diffraction grating 21, at least one of the above two types of optical materials 21 and 22 shows birefringence, and the other optical material 22 has a refractive index which is different from both the ordinary refractive index and the extraordinary refractive index of said one optical material 21 showing birefringence.

Further, in order to obtain a diffracting element of polarization type having a high diffraction efficiency and a uniform distribution in the plane, an alignment treatment film 11 is formed on one of two substrates 2 facing each other, spacers 12 to hold the space constant, and liquid crystal to be a thin film 1 of polymer liquid crystal, are sandwiched between the substrates 2 facing each other, the liquid crystal is aligned and cured by irradiation with light to obtain the thin film 1 of polymer liquid crystal, then one substrate is taken off, a grating having a cross-sectional shape of projections and recesses is formed on the thin film 1 of polymer liquid crystal, and the projections and recesses are filled with an isotropic medium.

16 Claims, 6 Drawing Sheets

(a)

(b)

(c)

OPTICAL HEAD DEVICE AND A DIFFRACTION ELEMENT SUITABLE FOR THE DEVICE, AND A METHOD OF MANUFACTURING THE DIFFRACTION ELEMENT AND THE OPTICAL HEAD DEVICE

BACKGROUND OF THE INVENTION

1. Technical Field

The present invention relates to an optical head device for writing optical information on or reading out optical information from an optical recording medium such as a CD or a DVD, a diffracting element suitable therefor, and a process for producing the diffracting element.

2. Background Art

Heretofore, to write optical information on an optical recording medium such as an optical disk or a magneto-optical disk such as a CD or a DVD, or to read out optical information from an optical recording medium, an optical head device provided with e.g. a diffracting element for introducing signal light as reflected light from the optical recording medium to a light-receiving element as a photodetector, has been used.

In order to increase the go and return efficiency of light of a diffracting element to at least the go and return efficiency of 10% of unpolarization type independent of the polarization direction of light, it has been proposed to use e.g. a hologram beam splitter of polarization type wherein the go and return efficiency varies depending upon the polarization direction of light, as the diffracting element.

The hologram beam splitter of polarization type has such a structure that an isotropic diffraction grating made of an isotropic optical material having a refractive index equal to the ordinary refractive index or the extraordinary refractive index of a birefringent optical material such as liquid crystal, formed on e.g. a glass substrate, and a facing substrate provided with an alignment film having alignment treatment applied thereto, are arranged so as to face each other and subjected to thermal contact bonding by means of a sealing material, and a birefringent optical material such as liquid crystal is filled in the inside.

In the case of using the hologram beam splitter of polarization type, the polarization direction of light when passing through the hologram beam splitter is rotated by 90 degree between the going path (the direction from the light source to the optical recording medium surface) and the returning path (the direction from the optical recording medium surface to the light source side and the light-receiving element side) by combining the hologram beam splitter with a quarter-wave plate.

Since an optical disk is rotated at a high speed, with respect to reflected light from the optical disk, having partial birefringence of at least one part, the polarization direction is not constant and varies with time, and the polarization direction in returning path relative to the polarization direction in going path departs from the 90 degree, and reflected light wherein the degree of the departure in the polarization direction is completely unclear, will come back.

In the worst case, the reflected light from the optical disk may come back in the same polarization direction as the going path. In this case, the hologram beam splitter of polarization type can hardly diffract the reflected light, whereby information in the optical disk can not be read out by the light-receiving element.

Under these circumstances, it is a first object of the present invention to provide a diffracting element and an optical head device for reading out information even from an optical recording medium having birefringency.

On the other hand, a diffracting element using a thin film of polymer liquid crystal has conventionally been prepared as follows. Namely, alignment treatment is applied to a transparent substrate surface of e.g. glass, this transparent substrate surface is thinly coated with liquid crystal, followed by curing by photopolymerization to obtain a thin film of polymer liquid crystal. A grating having a cross-sectional shape of projections and recesses is formed on the thin film of polymer liquid crystal by applying e.g. dry etching, and these projections and recesses are filled with an optical isotropic medium.

However, it is difficult to stabilize the alignment condition obtained when the substrate having the alignment treatment applied thereto is coated with the liquid crystal in the monomer state before the polymerization, in production of the thin film of polymer liquid crystal. If the alignment state is not stable, the substantial birefringent state after the polymerization may change, the refractive index may not be stable and no desired diffraction efficiency may be obtained, and a diffracting element can not be obtained with a high yield, such being problematic.

Further, it is also difficult to control the thickness of the film of polymer liquid crystal, and if the thickness of the film varies, the diffraction efficiency will vary, thus leading to decrease in the production yield of the diffracting element.

It is a second object of the present invention to provide a process for producing a diffracting element, in which the refractive index is stable as the thickness of the film is constant, whereby the desired diffraction efficiency can be obtained.

DISCLOSURE OF THE INVENTION

The present invention provides a diffracting element comprising an optical material forming a diffraction grating having a cross-sectional shape of projections and recesses, and a separate optical material filled at least in the recesses of the diffraction grating, wherein at least one of the above two types of optical materials shows birefringence, and the other optical material has at least one refractive index which is different from both the ordinary refractive index and the extraordinary refractive index of said one optical material showing birefringence.

The present invention further provides a process for producing a diffracting element having a grating having a cross-sectional shape of projections and recesses formed on a thin film of polymer liquid crystal, and having the grating having a cross-sectional shape of projections and recesses filled with an isotropic medium, which process comprises applying alignment treatment to a facing surface of at least one of two substrates facing each other, sandwiching spacers and liquid crystal to be a thin film of polymer liquid crystal between the substrates facing each other, having the liquid crystal aligned and cured to obtain the thin film of polymer liquid crystal, and then taking at least one substrate off and forming a grating having a cross-sectional shape of projections and recesses on the thin film of polymer liquid crystal, and filling at least the recesses of the grating having a cross-sectional shape of projections and recesses with an isotropic medium.

The present invention further provides an optical head device comprising a light source, a diffracting element for passing light emitted from the light source therethrough and changing the traveling direction of reflected light reflected and coming back from an optical recording medium, and a photodetector for detecting information of the reflected light having the traveling direction changed by the diffracting element, wherein the above-mentioned diffracting element is used as the diffracting element.

BEST MODE FOR CARRYING OUT THE INVENTION

The present invention is characterized by that at least one of two types of optical materials of an optical material forming a diffraction grating having a cross-sectional shape of projections and recesses, and a separate optical material filled at least in the recesses of the diffracting grating, shows birefringence, and the other optical material has at least one refractive index which is different from both the ordinary refractive index and the extraordinary refractive index of said one optical material showing birefringence. The above expression "filled at least in the recesses" has the same meaning as another expression "filled at least between the projections". Hereinafter, the latter expression may sometimes be employed.

According to the basic embodiment, one of the two types of optical materials is an isotropic optical material. It is preferred to use an isotropic optical material in view of production efficiency since alignment treatment can easily be carried out in the case of using polymer liquid crystal as the a birefringent optical material.

Although the refractive index of the isotropic optical material may be a middle value between the ordinary refractive index and the extraordinary refractive index of the birefringent optical material, preferably it is smaller than the smaller one of the ordinary refractive index and the extraordinary refractive index of the birefringent optical material, or larger than the larger one of these indices.

Further, two types of optical materials having such a difference in refractive index that the first-order diffraction efficiency to the polarization direction where the diffraction efficiency becomes lowest, is at least 10% to the first-order diffraction efficiency to the polarization direction where the diffraction efficiency becomes highest, and the product of the zero-order transmittance efficiency to the polarization direction where the diffraction efficiency becomes lowest, and the first-order diffraction efficiency to the polarization direction where the diffraction efficiency becomes highest, is at least 10%, are used. Here, the first-order diffraction efficiency is meant for a diffraction efficiency of either one of ± first-order diffraction lights.

In an optical head device comprising a light source, a diffracting element for passing light emitted from the light source therethrough and changing the traveling direction of reflected light reflected and coming back from an optical recording medium, and a photodetector for detecting information of the reflected light having the traveling direction changed by the diffracting element, the above-mentioned diffracting element is used as the diffracting element.

Figure 1:
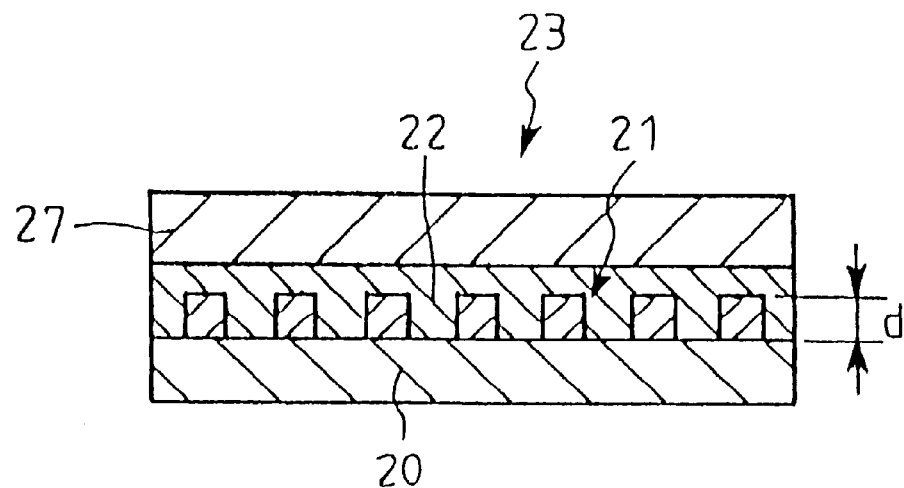
FIG. 1 is a side cross-sectional view illustrating a diffracting element of polarization type according to the first embodiment of the present invention.

As a specific structure, for example, as shown in FIG. 1, a birefringent diffraction grating 21 having a cross-sectional shape of rectangular waves is formed on a substrate 20 of e.g. glass, at least the recesses of the birefringent diffraction grating 21 are filled with an isotropic filler 22 to constitute a diffracting element 23, and the diffracting element 23 is interposed between an optical disk and a light source in an optical head device.

Figure 2:
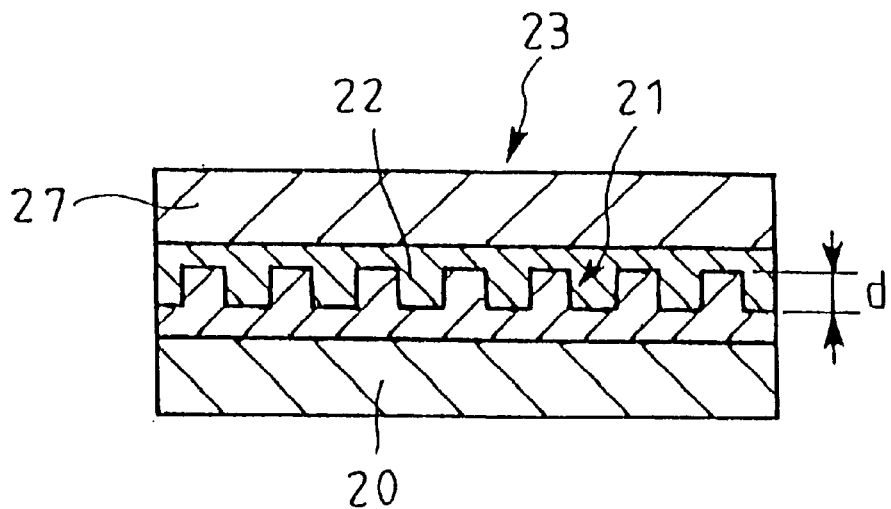
FIG. 2 is a side cross-sectional view illustrating another diffracting element of polarization type according to the first embodiment of the present invention.

As shown in FIG. 1, the birefringent optical material between the projections may completely be removed, or the structure may be such that a predetermined amount of the birefringent optical material between the projections may be left as shown in FIG. 2, in order to adjust the grating depth d of the birefringent diffraction grating 21.

In this case, as the birefringent optical material constituting the birefringent diffraction grating 21, polymer liquid crystal obtained by having liquid crystal in a monomer state aligned and polymerized for high polymerization, or a monoaxially-stretched polymer film or a birefringent single crystal may, for example, be used. Further, as the isotropic optical material constituting the isotropic filler 22, an acryl type resin or an epoxy type resin may, for example, be used.

In both cases of completely removing the birefringent optical material in the recesses (FIG. 1) and leaving a predetermined amount of the birefringent optical material in the recesses (FIG. 2), a quarter-wave plate 27 may be integrated therewith at the top, whereby the number of parts can be reduced, and light weight and miniaturization can be attempted, such being advantageous. The quarter-wave plate 27 may be provided separately from a facing substrate.

Firstly, a combination of the birefringent optical material and the isotropic material is selected so that $n_s \neq n_e$ and $n_s \neq n_o$, where $n_o$ is the ordinary refractive index and $n_e$ is the extraordinary refractive index of the birefringent optical material, and $n_s$ is the refractive index of the isotropic material, whereby the isotropic optical material shows a refractive index different from the birefringent optical material, to both the polarization in the ordinary refractive index direction or the polarization in the extraordinary refractive index direction of the birefringent optical material, and accordingly the diffracting element 23 has a diffraction efficiency regardless of the polarization direction of light.

Figure 5:
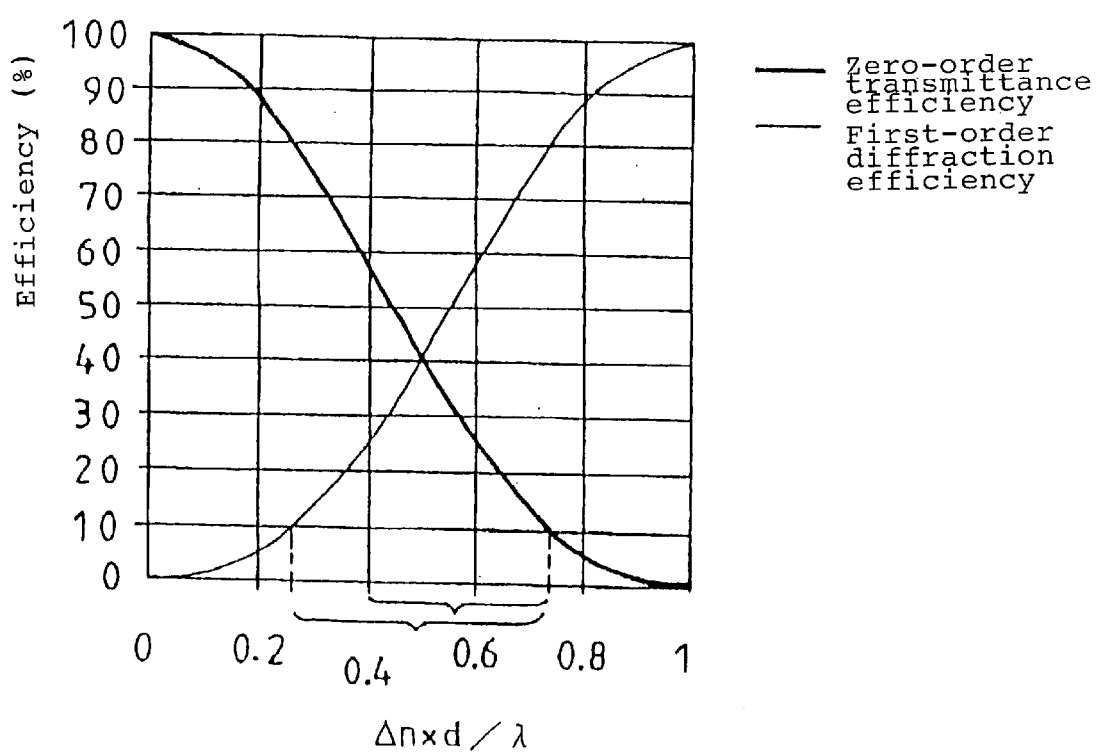
FIG. 5 is a graph illustrating the relation between efficiency and a phase difference $\Delta n \times d / \lambda$ as defined by wavelength, according to the second embodiment of the present invention.

The diffraction efficiency and the transmittance efficiency of the diffracting element 23 are obtained based on e.g. a graph of FIG. 5 illustrating the relation between the efficiency and a phase difference $\Delta n \times d/\lambda$ as defined by wavelength, where $\Delta n$ is a difference in refractive index between two optical materials, d is a grating depth, and $\lambda$ is a wavelength of light.

Among these, the wavelength $\lambda$ of light is preliminarily determined depending upon the use as the wavelength oscillated from the light source, and accordingly, the diffraction efficiency will be determined by the refractive index difference $\Delta n$ and the grating depth d. However, a great grating depth d involves difficulty in diffracting element production, and accordingly it is preferred to determined the diffraction efficiency mainly by the refractive index difference $\Delta n$.

In a case where the refractive index $n_s$ of the isotropic material is an intermediate value between the ordinary refractive index $n_o$ and the extraordinary refractive index $n_e$ of the birefringent optical material ($n_e < n_s < n_o$ or $n_o < n_s < n_e$), there will be a little difference between refractive index differences $\Delta n_1$ and $\Delta n_2$, where $\Delta n_1 = |n_e - n_s|$ is a refractive index difference between birefringent optical material and the isotropic optical material in the extraordinary refractive index direction of the birefringent optical material, and $\Delta n_2 = |n_o - n_s|$ is a refractive index difference between the birefringent optical material and the isotropic optical material in the ordinary refractive index direction of the birefringent optical material. Accordingly, it is necessary to set e.g. the diffraction efficiency by making the grating depth d to be great, such being structurally disadvantageous.

Accordingly, the refractive index $n_s$ of the isotropic material is made to be smaller than the smaller one of the ordinary refractive index $n_o$ and the extraordinary refractive index $n_e$ of the birefringent optical material, or larger than the larger one of these indices ($n_s < n_e$, $n_o$ or $n_e$, $n_o < n_s$), whereby a great difference between refractive index differences $\Delta n_1$ and $\Delta n_2$ can be obtained, and accordingly, e.g. the diffraction efficiency can easily be set without making the grating depth d to be great, such being greatly advantageous structurally.

Here, the go and return efficiency is high when the zero-order transmittance efficiency in going path is high (i.e. the first-order diffraction efficiency is low), and the first-order diffraction efficiency in returning path is high, and accordingly it is preferred to make the polarization direction of the going light to be A direction, and the polarization direction of the returning light to be B direction, where the A direction is a polarization direction where the diffraction efficiency becomes lowest, and the B direction is a polarization direction where the diffraction efficiency becomes highest. Further, the first-order diffraction efficiency to the polarization direction in returning path (in B direction) is preferably as high as possible, whereby the go and return efficiency of light can be increased. With respect to the first-order diffraction efficiency to the polarization direction in B direction, a level of substantially 40% can be secured, according to FIG. 3.

In order to obtain a go and return efficiency of at least 10% which is a theoretical go and return efficiency of the hologram beam splitter of unpolarization type, the zero-order transmittance efficiency to the polarization in going path (in A direction) is required to be at least substantially 30% with a little surplus, since the first-order diffraction efficiency in returning path is substantially 40% (or below practically).

On the other hand, if the optical disk has birefringence, in the worst case, the polarization direction in returning path is the polarization direction in A direction, the same as in going path. In such a case, the light is diffracted with the first-order diffraction efficiency to the polarization direction in A direction. However, if the first-order diffraction efficiency to the same polarization direction as in going path is made to be too low, the light can not effectively be detected by the light-receiving element.

The magnification to correct a signal by an automatic gain control circuit connected with the light-receiving element, is at most substantially about a level of 10 times. Accordingly, light can effectively be detected by the light-receiving element by making the first-order diffraction efficiency to the polarization in A direction to be at least 10% of the first-order diffraction efficiency to the polarization in B direction. Here, to simplify the constitution of the automatic gain correction circuit, the first-order diffraction efficiency to the polarization in A direction is at least 25% of the first-order diffraction efficiency to the polarization in B direction.

Here, there is such a relation that when the zero-order transmittance efficiency is high, the first-order diffraction efficiency will be low, and when the zero-order transmittance efficiency is low, the first-order diffraction efficiency will be high. Accordingly, by setting the zero-order transmittance efficiency and the first-order diffraction efficiency in the polarization direction of A direction corresponding to the going path, to be within a range satisfying both above-mentioned conditions, information can be read out even from an optical disk having birefringence.

Here, an optical disk does not always have a portion having birefringence. Accordingly, it is preferred to displace the quarter-wave plate between the diffracting element 23 and the optical disk in order that the polarization direction of the returning path is perpendicular to the polarization direction of the going path.

Now, how to determine the diffractive indices $n_o$, $n_e$ and $n_s$, will be explained more specifically, with respect to the case where a birefringent optical material having a smaller ordinary refractive index $n_o$ than the a extraordinary refractive index $n_e$, and an isotropic material having a smaller refractive index $n_s$ than the ordinary refractive index $n_o$ of the birefringent optical material, are used, i.e. $n_s < n_o < n_e$, and a diffraction grating having a cross-sectional shape of rectangular waves with a ratio in width of the recesses to the projections of 1:1, is used.

Figure 3:
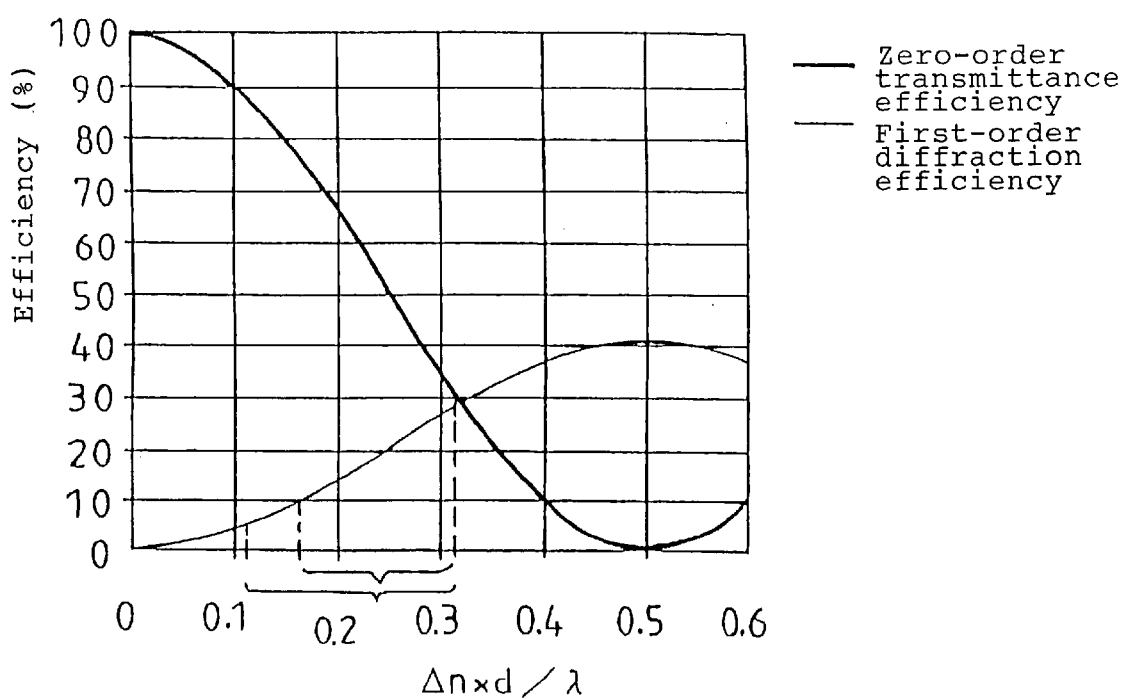
FIG. 3 is a graph illustrating the relation between efficiency and a phase difference $\Delta n \times d / \lambda$ as defined by wavelength, according to the first embodiment of the present invention.

In the case of using the diffraction grating having a cross-sectional shape of rectangular waves with a ratio in width of the recesses to the projections of 1:1, the relation between the efficiency and the phase difference $\Delta n \times d/\lambda$ as defined by wavelength, is as shown in FIG. 3, and it is known from Figure that the ±first-order diffraction efficiencies are highest of 40.5% respectively, when $\Delta n \times d/\lambda = 0.5$.

In this case, the direction of the ordinary refractive index $n_o$ is the A direction where the diffraction efficiency becomes lowest, and the direction of the extraordinary refractive index $n_e$ is the B direction where the diffraction efficiency becomes highest. Accordingly, the A direction is set to be the polarization direction of going path, and the B direction is set to be the polarization direction of returning path.

Further, to make the first-order diffraction efficiency to be 40.5% as the maximum, the value of $\Delta n_1 \times d$ is optimized to make the value of $\Delta n \times d/\lambda$ to be 0.5 or in the vicinity of 0.5, where $\Delta n_1 = |n_e - n_s|$ is the refractive index difference in B direction.

Further, to secure a go and return efficiency of at least 10% which is the theoretical go and return efficiency of the diffracting element of unpolarization type, it is necessary to make the zero-order transmittance efficiency in going path to be at least substantially 30% (in the case where the first-order diffraction efficiency in returning path is 40.5%, the zero-order transmittance efficiency in going path may be at least substantially 25% calculatively, however, such a high value of 40.5% of the first-order diffraction efficiency in returning path will not be obtained practically). Accordingly, the value of $\Delta n \times d/\lambda$ is made to be at most substantially 0.32, where $\Delta n_2 = |n_o - n_s|$ is the refractive index difference in going path.

Further, the first-order diffraction efficiency to the polarization in the direction of the ordinary refractive index $n_o$ (A direction) is required to be at least 10%, preferably at least 25%, of the first-order diffraction efficiency (=40.5%) to the polarization in the direction of the extraordinary refractive index $n_e$ (B direction), as mentioned above. Accordingly, the first-order diffraction efficiency is at least $40.5\% \times 1/10 \approx 4\%$, preferably at least $40.5\% \times 1/4 \approx 10\%$, and the value of $\Delta n \times d/\lambda$ satisfying this condition is at least substantially 0.11, preferably at least substantially 0.17. As a result, as the value of $\Delta n \times d/\lambda$, a range of at least substantially 0.11, preferably at least substantially 0.17, and at most substantially 0.32, is obtained.

Figure 4:
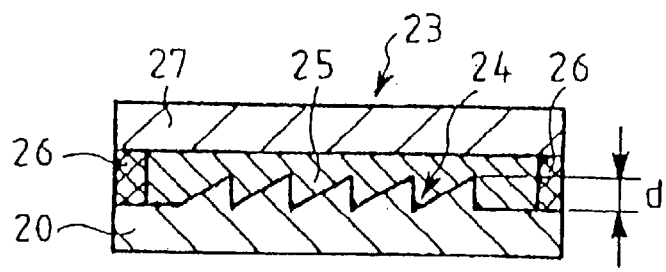
FIG. 4 is a side cross-sectional view illustrating a diffracting element of polarization type according to the second embodiment of the present invention.

FIG. 4 illustrate a case where the diffraction grating has a saw-teeth shape according to the second embodiment of the present invention. When the diffraction grating has a cross-sectional shape of as shown in FIG. 5, the saw-tooth shape, first-order diffraction efficiency becomes highest of substantially 100% when $\Delta n \times d/\lambda = 1.0$. Accordingly, by setting the first-order diffraction efficiency to the polarization in B direction to be in the vicinity of 100%, the zero-order transmittance efficiency to the polarization in A direction, to obtain a go and return efficiency of at least 10% which is the theoretical go and return efficiency of the diffracting element of unpolarization type, will be at least substantially 10%, and the value of $\Delta n \times d/\lambda$ satisfying this condition is at most substantially 0.76.

Further, the first-order diffraction efficiency to the polarization in A direction which is at least 10%, preferably at least 25%, of the first-order diffraction efficiency (substantially 100%) to the polarization in B direction, is at least substantially 10%, preferably at least substantially 25%, and the value of $\Delta n \times d/\lambda$ satisfying this condition is at least substantially 0.25, preferably at least substantially 0.4.

As a result, as the value of $\Delta n \times d/\lambda$, a range of at least substantially 0.25, preferably at least substantially 0.4, and at most substantially 0.74, is obtained.

Besides the above, substantially the same constitution as the above-mentioned embodiments is provided, and the similar actions/effects will be obtained.

Figure 6A:
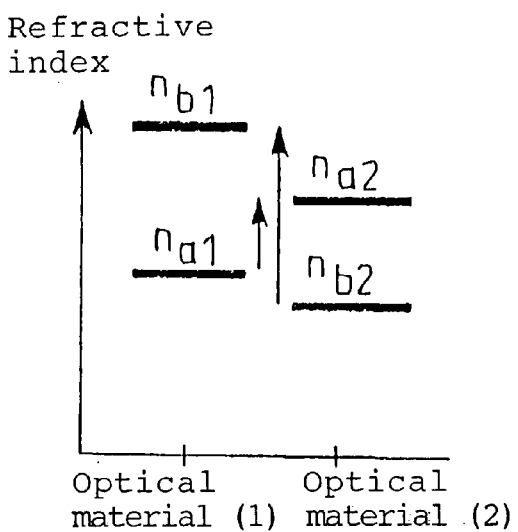
FIG. 6($a$), FIG. 6($b$) and FIG. 6($c$) are figures illustrating the relation among refractive indices of two birefringent optical materials according to the third embodiment of the present invention.
Figure 6B:
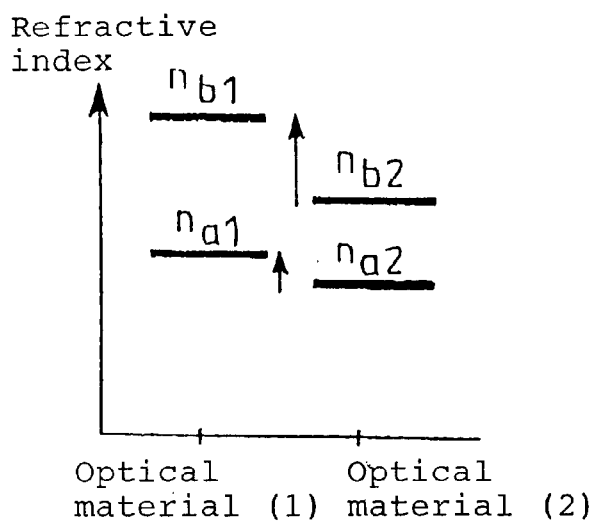
Figure 6C:
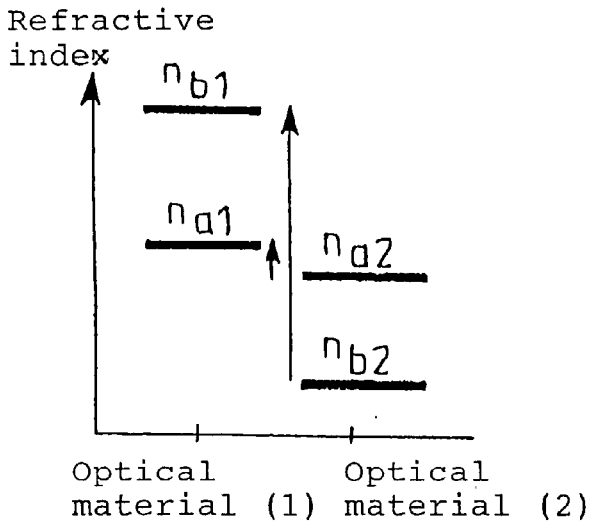

FIG. 6(a), FIG. 6(b) and FIG. 6(c) are figures illustrating the relation of refractive indices of two birefringent optical materials according to the third embodiment of the present invention.

The present embodiment is characterized by that both the two types of optical materials are birefringent optical materials. In this case, at least three of the ordinary refractive indices and the extraordinary refractive indices of the two types of birefringent optical materials are different from one another.

For example, as shown in FIG. 6, when the two types of birefringent optical materials are an optical material (1) and an optical material (2), and between the ordinary refractive index and the extraordinary refractive index of the optical material (1), the refractive index in A direction is represented as $n_{a1}$, and the refractive index in B direction as $n_{b1}$, and between the ordinary refractive index and the extraordinary refractive index of the optical material (2), the refractive index in A direction is represented as $n_{a2}$, and the refractive index in B direction as $n_{b2}$, the ordinary refractive index and the extraordinary refractive index can be set to either of $n_{a1}$ and $n_{b1}$, or $n_{a2}$ and $n_{b2}$, by adjusting the directions of the refractive indices of the optical material (1) and the optical material (2). Accordingly, as shown in FIG. 6(a), for example, in a case where the higher one of the ordinary refractive index and the extraordinary refractive index of the optical material (2) is between the ordinary refractive index and the extraordinary refractive index of the optical material (1), and the lower one of the ordinary refractive index and the extraordinary refractive index of the optical material (2) is lower than the lower one of the ordinary refractive index and the extraordinary refractive index of the optical material (1), the lower refractive index between the ordinary refractive index and the extraordinary refractive index of the optical material (1) is made to be in A direction and the higher refractive index in B direction, and the higher refractive index between the ordinary refractive index and the extraordinary refractive index of the optical material (2) is made to be in A direction and the lower refractive index in B direction, to obtain the refractive index difference in A direction $\Delta n_2$ ($=|n_{a1}-n_{a2}|$) and the refractive index difference in B direction $\Delta n_1$ ($=|n_{b1}-n_{b2}|$). Otherwise, as shown in FIG. 6(b), the lower refractive index between the ordinary refractive index and the extraordinary refractive index of the optical material (1) is made to be in A direction and the higher refractive index in B direction, and the lower refractive index between the ordinary refractive index and the extraordinary refractive index of the optical material (2) is made to be in A direction and the higher refractive index in B direction, to obtain the refractive index difference in A direction $\Delta n_2$ ($=|n_{a1}-n_{a2}|$) and the refractive index difference in B direction $\Delta n_1$ ($=|n_{b1}-n_{b2}|$) whereupon the refractive index difference, or the phase difference $\Delta n \times d/\lambda$ as defined by wavelength, is selected, and the first-order diffraction efficiency and the zero-order transmittance efficiency are set.

Further, as shown in FIG. 6(c), in a case where the higher one of the ordinary refractive index and the extraordinary refractive index of the optical material (2) is lower than the lower one of the ordinary refractive index and the extraordinary refractive index of the optical material (1), the lower refractive index between the ordinary refractive index and the extraordinary refractive index of the optical material (1) is made to be in A direction and the higher refractive index in B direction, and the higher refractive index between the ordinary refractive index and the extraordinary refractive index of the optical immaterial (2) is made to be in A direction and the lower refractive index in B direction, to obtain the refractive index difference in A direction $\Delta n_2$ ($=|n_{a1}-n_{a2}|$) and the refractive index difference in B direction $\Delta n_1$ ($=|n_{b1}-n_{b2}|$), or not shown, the lower refractive index between the ordinary refractive index and the extraordinary refractive index of the optical material (1) is made to be in A direction and the higher refractive index in B direction, and the higher refractive index between the ordinary refractive index and the extraordinary refractive index of the optical material (2) is made to be in B direction and the lower refractive index in A direction, to obtain the refractive index difference in A direction $\Delta n_2$ ($=|n_{a1}-n_{a2}|$) and the refractive index difference in B direction $\Delta_{n1}$ ($=|n_{b1}-n_{b2}|$), whereupon the refractive index difference, or the phase difference $\Delta n \times d/\lambda$ as defined by wavelength, is selected, and the first-order diffraction efficiency and the zero-order transmittance efficiency are set.

Further, also in a case where both the ordinary refractive index and the extraordinary refractive index of the optical material (2) are between the ordinary refractive index and the extraordinary refractive index of the optical material (1), the refractive index difference, or the phase difference $\Delta n \times d / \lambda$ as defined by wavelength, is selected, and the first-order diffraction efficiency and the zero-order transmittance efficiency can be set, similarly.

As mentioned above, when both the two types of optical materials are birefringent optical materials, the refractive index difference can be selected in a wider range, whereby the first-order diffraction efficiency and the zero-order transmittance efficiency can be set more freely.

Besides the above, substantially the same constitution as the above-mentioned embodiments is provided, and the similar actions/effects will be obtained.

Now, the best mode for carrying out the present invention will be explained relating to the process for producing a diffracting element.

In the present invention, in a case of applying alignment treatment to the facing surface of two substrates facing each other, i.e. the surface to be in contact with liquid crystal, the treatment may be applied to one substrate or two substrates, and it is preferred to apply the treatment to two substrates since the molecular alignment of the liquid crystal will be controlled easily. The alignment treatment to be used here is represented by rubbing treatment to e.g. the surface of the substrate, or to a polymer film of a polyimide film or a polyamide film or an inorganic film of e.g. $SiO_2$, attached to the surface of the substrate, or oblique vapor-deposit treatment of SiO.

The liquid crystal to form a thin film of polymer liquid crystal to be used in the present invention may be any composition of e.g. a reactive compound such as a monomer showing liquid crystallinity and an oligomer, which undergoes liquid crystal alignment as the composition by the alignment treatment to the substrate. In the following explanation, the composition of e.g. a reactive compound showing liquid crystallinity will be referred to as a liquid crystal material. Accordingly, it is meant that the liquid crystal material is not a polymer.

A thin film of polymer liquid crystal is obtained in such a manner that spacers are disposed between the two substrates to face each other, the substrates are arranged to face each other with a certain space, a liquid crystal material is injected into the space, and the liquid crystal material is polymerized and cured by a curing means.

As the means of curing the liquid crystal material, a method of irradiating with light such as visible light or UV (ultraviolet) light, or a method by heating may, for example, be mentioned. The curing method of irradiating with light such as visible light or UV light is particularly preferred since it can be carried out directly on the substrate. Accordingly, an explanation will be given presuming the liquid crystal material is polymerized and cured by irradiation with light.

Figure 7:
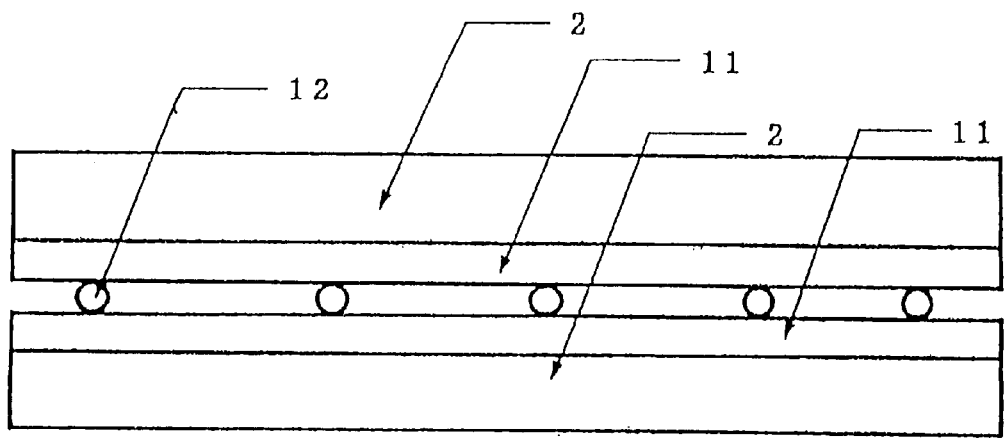
FIG. 7($a$), FIG. 7($b$) and FIG. 7($c$) are cross-sectional views illustrating one example of steps to produce a thin film of polymer liquid crystal.
Figure 7:
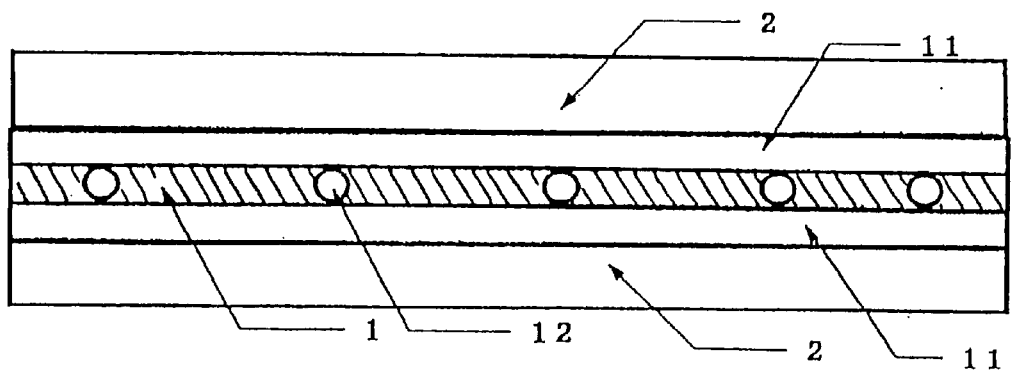
Figure 7:
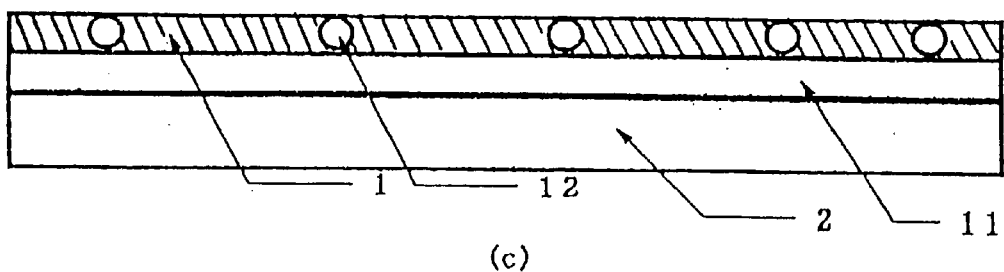

One example of steps for producing the thin film of polymer liquid crystal is shown in FIG. 7. FIG. 7(a) is a cross-sectional view illustrating two substrates facing each other with a certain space, FIG. 7(b) is a cross-sectional view illustrating the state in which a liquid crystal material is injected between the two substrates facing each other, followed by irradiation a with light such as UV light to obtain a thin film of polymer liquid crystal, and FIG. 7(c) is a cross-sectional view illustrating the state in which one of the two substrates facing each other is taken off. In FIG. 7, numeral 1 indicates a thin film of polymer liquid crystal, numeral 2 indicates a substrate, numeral 11 indicates an alignment treatment film, and numeral 12 indicates a spacer.

As the method of injecting the liquid crystal material, vacuum injection method may be employed, or the injection may be carried out by a method utilizing capillarity in an atmospheric pressure. In this case, prior to this, the spacers may preliminarily be dispersed on the first substrate and then the second substrate may be laminated thereon. Further, a mixture of the spacers and the liquid crystal material may be dropped on the first substrate and then the second substrate may be laminated thereon followed by pressing.

Further, the spacers may be dispersed on the first substrate and then the liquid crystal material may be dropped thereon, and the second substrate may be laminated thereon followed by pressing to obtain the thin film. As the substrate, a transparent glass sheet or a plastic sheet may, for example, be used, and a glass sheet is preferred in view of e.g. excellent hardness and durability.

Then, between the substrates facing each other, a means to hold the certain space between them and the liquid crystal material to be the thin film of polymer liquid crystal are sandwiched. The liquid crystal material to be used is selected preferably from esters of e.g. acrylic acid or methacrylic acid.

Among these, an acrylic acid type as a material which adds reaction groups to the liquid crystal material and is polymerized for high polymerization (side chain type polymer liquid crystal) is preferred. This polymerization liquid crystal has excellent characteristics that the birefringence of the material itself is high, and besides, the liquid crystal material sensitively reacts to the alignment treatment to the substrate and the birefringence after the polymerization can thereby be made high easily.

A distribution in the thickness of the thin film of polymer liquid crystal will cause irregularity in the diffraction efficiency as mentioned above, such being unfavorable. Accordingly, in the production process of the present invention, spacers are used as the means to hold a certain space between two substrates. As the spacers, any type of spacers made of plastic or an inorganic substance such as glass, alumina or silica having rigidity and durability in the form of spheres, particles or fibers, will achieve the function, and glass spacers are particularly excellent in rigidity and durability and are preferred. The thickness of the thin film of polymer liquid crystal is usually from 1 to 5 $\mu$m.

As the glass, preferred is spherical $SiO_2$ glass, and the number is preferably from 10 to 200,000 per 1 $cm^2$ in a case where the diameter is at most 2 $\mu$m. If it is smaller than 10, it will be difficult to hold the space between the substrates constant, and if it is higher than 200,000, light scattering will be caused, whereby stray light may be caused when attached to the optical head device, such being undesirable. Preferably it is from 1,000 to 10,000, and in this case, the above-mentioned inconvenience can be avoided effectively.

For the light irradiation carried out after the liquid crystal material is aligned, e.g. visible light or UV light will be used as mentioned above, and UV light is preferred for effective curing. By carrying out the light irradiation, the liquid crystal material can be cured while maintaining the alignment state.

After the curing, at least one substrate of the two substrates facing each other is taken off (FIG. 7(c)). In this case, in order to prevent deposition of the thin film of polymer liquid crystal on the substrate to be taken off, it is preferred to apply release treatment to the inside surface, i.e. the surface to be in contact with the liquid crystal material, of the substrate to be taken off.

In the case where the alignment treatment is applied to the inside surface of one substrate between the two substrates facing each other, it is preferred to apply the release treatment to the inside surface of the substrate having no alignment treatment applied thereto, in order to increase the alignment effect of the liquid crystal material.

As the releasing agent to be used for the release treatment, e.g. a fluorosilane type or a fluorine-containing polymer having a fluorine-containing alicyclic structure may, for example, be used.

A grating having a cross-sectional shape of projections and recesses is formed on the thin film of polymer liquid crystal thus produced, and at least the recesses are filled with an isotropic medium to obtain a diffracting element.

Namely, a grating having a cross-sectional shape of projections and recesses is formed on the thin film of polymer liquid crystal by e.g. etching method by means of photolithography or by pressing method by means of a mold having a shape of a grating. The grating having a cross-sectional shape of projections and recesses is formed, and at least the recesses are filled with an isotropic medium having a refractive index different from both the ordinary refractive index ($n_o$) and the extraordinary refractive index ($n_e$) of the thin film of polymer liquid crystal, followed by curing. In this case, if e.g. an optical disk as an optical recording medium has birefringence, as mentioned above, an effect of not decreasing the strength of the signal light reflected from the optical disk can be obtained by combining with this diffracting element, and such is extremely preferred.

Here, the isotropic medium can be utilized also in a case where the projections and the recesses are filled with an optically isotropic medium having a refractive index equal to the ordinary refractive index ($n_o$) or the extraordinary refractive index ($n_e$) of the thin film of polymer liquid crystal. As the isotropic medium, a photopolymerizable type acrylic resin or epoxy resin may, for example, be used.

The diffracting element produced by the production process of the present invention has excellent characteristics that it has a good alignment in one direction of the molecular axis of the polymer liquid crystal, whereby the refractive index is uniform and high in the diffracting element, and besides, the thickness of the thin film of polymer liquid crystal is uniform, and accordingly, a high and uniform diffraction efficiency will be obtained.

The polarization direction may change depending upon e.g. the angle of incidence when light is transmitted through the thin film of polymer liquid crystal remained at the recesses of the diffraction grating. Accordingly, it is preferred to completely remove the thin film of polymer liquid crystal at the recesses.

Further, the diffracting element produced by the production process of the present invention is attached to the optical head device. Namely, the diffracting element produced by the production process of the present invention is used as the diffracting element for an optical head device in which light emitted from a laser diode is introduced to an optical recording medium, reflected light from the optical recording medium is diffracted by the diffracting element, and the diffracted light is detected by a photodetector.

Figure 8:
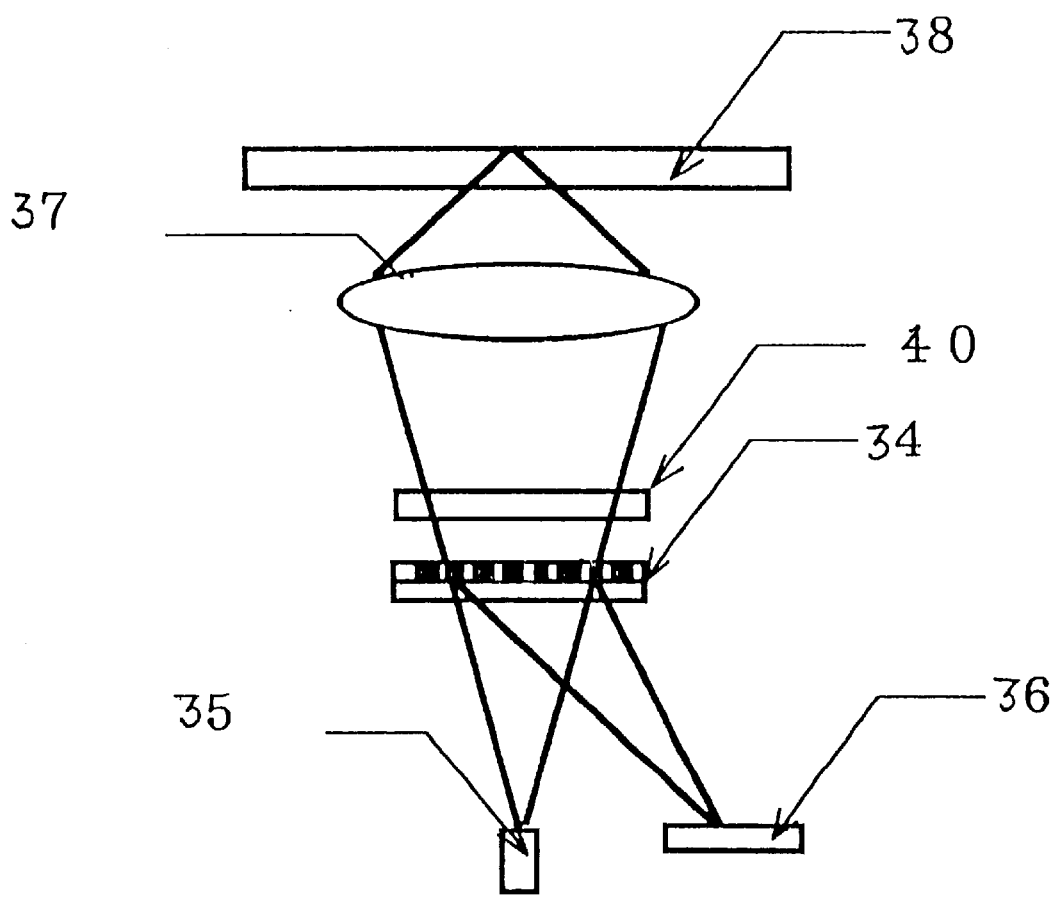
FIG. 8 is a schematic cross-sectional view illustrating a case where the diffracting element of the present invention is used for an optical head device as a hologram beam splitter.

A schematic cross-sectional view illustrating a case where the diffracting element of the present invention is used for an optical head device as a hologram beam splitter, is shown in FIG. 8. Light emitted from a laser diode 35 as a light source is transmitted through a hologram beam splitter which is a diffracting element 34, and converged on an optical disk 38 by an objective lens, and reflected light from the optical disk 38 is transmitted through the objective lens 37 again, diffracted by the hologram beam splitter, and reaches a light-receiving element 36 as a photodetector.

By inserting a quarter-wave plate 40 between the hologram beam splitter and the optical disk 38, information light which is the reflected light can be detected even when the optical disk 38 has birefringence, and the polarization direction of linearly polarized light emitted from the laser diode 35 is rotated by any angle between the going path and the returning path as mentioned above.

EXAMPLES

Example 1

Cross-sectional views illustrating each step of the process for producing a thin film of polymer liquid crystal are shown in FIG. 7(a), (b) and (c).

Firstly, as shown in FIG. 7(a), thin films of a polyimide were formed on the inside surfaces of two glass substrates 2 having a diameter of 3 inches facing each other, and then rubbing was carried out between the two substrates in one parallel direction as rubbing treatment to carry out alignment treatment, and alignment treatment films 11 were obtained. A fluorosilane type releasing agent was coated on the alignment treatment film 11 of one substrate of the two glass substrates 2 facing each other (not shown).

Spherical spacers 12 made of $SiO_2$ having a diameter of 2.0 $\mu$m were dispersed on the other substrate with a density of 6,000 spacers per $cm^2$, and these two substrates were bonded to each other with an inside space of 2 $\mu$m. Then, as shown in FIG. 7(b), an acrylic acid type nematic phase liquid crystal material was injected into the space between the two substrates by vacuum injection method.

When the alignment state of the liquid crystal was observed under this condition, it was observed that the molecular axes of the liquid crystal material were orderly aligned in the rubbing direction, and a good alignment state was confirmed. Then, UV light of 600 mJ was irradiated through the glass substrates to cure the liquid crystal material by photopolymerization to form a thin film 1 of polymer liquid crystal. The alignment state of polymer liquid crystal was also uniform and good.

Further, as shown in FIG. 7(c), the substrate having release treatment applied thereto was taken off. As a result, the polymer liquid crystal on the substrate having no release treatment applied thereto remained on the substrate without peeling, and the thin film 1 of polymer liquid crystal could be formed on this substrate side. The alignment state was as good as the state before the substrate was taken off. Further, the thickness of the thin film 1 of polymer liquid crystal was about 2 $\mu$m, and an uniform film thickness could be obtained as designed.

Then, on the thin film 1 of polymer liquid crystal as a birefringent material on the substrate, a grating (FIG. 1) having a cross-sectional shape of projections and recesses and having a longitudinal direction parallel to the rubbing direction was formed by etching method by means of photolithography, and the grating was filled with an acrylic type isotropic medium 3 followed by curing.

The refractive index of the isotropic medium 3 at this time was equal to the ordinary refractive index of the thin film 1 of polymer liquid crystal. Then, the substrate was cut to have an outer size of 4 mm×4 mm, to obtain a hologram beam splitter as a polarized diffracting element.

The hologram beam splitter thus produced was incorporated with an optical head device as a diffracting element 34 as shown in FIG. 8. The hologram beam splitter loaded on the optical head device showed a high transmittance of 95% to the linear polarized light as a going light, emitted from a laser diode 35, and showed a high±first-order diffraction efficiencies of 36% to the polarized light as a returning light, which was reflected from an optical disk 38 and transmitted through a quarter-wave plate 40, and of which the polarization direction was rotated by 90 degree relative to the going light.

Accordingly, a high light utilization efficiency of 0.95× 0.36=0.34, i.e. 34%, could be obtained, and besides, the diffraction efficiency of this hologram beam splitter was uniform in the plane.

Further, presuming a case where the optical disk had a high birefringence, the go and return efficiency where the polarization direction in returning path was A direction which was the same as in going path, was studied, whereupon it was 95%×0%=0%.

Example 2

A diffracting element 23 similar to one shown in FIG. 1 was prepared by filling a birefringent diffraction grating 21 having a cross-sectional shape of rectangular waves with an isotropic filler 22.

In this case, polymer liquid crystal having an ordinary refractive index no of 1.52 and an extraordinary refractive index ne of 1.64 was used as the birefringent diffraction grating 21, and an acrylic type isotropic medium having a refractive index ns of 1.43 was used as the isotropic filler 22. The grating depth d was set to be about 1.62 $\mu$m, and a light source having a wavelength $\lambda$ of 650 nm was used.

Of this diffracting element 23, the refractive index difference $\Delta n_1$ in B direction where the refractive index became highest was 1.64−1.43=0.21, and since the grating depth d was 1.62 $\mu$m and the wavelength $\lambda$ was 650 nm, the value of $\Delta n \times d/\lambda$ was substantially 0.5, and with respect to the first-order diffraction efficiency to the polarized light in B direction, a value of about 38% close to the theoretical limit was obtained.

Further, of this diffracting element 23, the refractive index difference $\Delta n_2$ in A direction where the refractive index became lowest was 1.52−1.43=0.09, and since the grating depth d was 1.62 $\mu$m and the wavelength $\lambda$ was 650 nm, the value of $\Delta n_2 \times d/\lambda$ was substantially 0.22, and values of the zero-order transmittance efficiency of substantially 58% and the first-order diffraction efficiency of substantially 15% to the polarized light in A direction, were obtained.

The above-mentioned diffracting element was loaded on an optical head device. In a case of an optical disk having substantially no birefringence, the emitted light polarized in A direction was transmitted through the diffracting element 23 with a zero-order transmittance efficiency of 58%, converted to a circularly polarized light with a quarter-wave plate, reflected from an optical disk, converted to a polarized light in B direction with the quarter-wave plate again, then diffracted by the diffracting element 23 with a first-order diffraction efficiency of 38%, and reached a light-receiving element. The go and return efficiency at this time was 58%×38%≈22%. Here, the value is a calculated value presuming that there was no aperture limit by the diameter of an objective lens, reflection loss of the disk or the like.

Further, presuming that the optical disk had a high birefringence, the go and return efficiency where the polarization direction in returning path was A direction, which was the same as in going path, was studied, whereupon it was 58%×15%=8.7%.

Example 3

A diffracting element 23 similar to one obtained in Example 2 was prepared. Here, polymer liquid crystal having an ordinary refractive index $n_o$ of 1.57 and an extraordinary refractive index $n_e$ of 1.68 was used as the birefringent diffraction grating 21, and an acrylic type isotropic medium having a refractive index $n_s$ of 1.49 was used as the isotropic filler 22. The grating depth d was set to be about 1.75 $\mu$m, and a light source having a wavelength $\lambda$ of 650 nm was used.

Of this diffracting element 23, the refractive index difference $\Delta n_1$ in B direction where the refractive index became highest was 0.19, and the refractive index difference $\Delta n_2$ in A direction where the refractive index became lowest was 0.08. Since the grating depth d was 1.75 $\mu$m and the wavelength $\lambda$ was 650 nm, the value of $\Delta n_1 \times d/\lambda$ was substantially 0.5, and the value of $\Delta n_2 \times d/\lambda$ was substantially 0.22, and the first-order diffraction efficiency to the polarized light in B direction, and the zero-order transmittance efficiency and the first-order diffraction efficiency to the polarized light in A direction were all similar to those obtained in Example 2.

Further, also in the case where the above-mentioned diffracting element was loaded on an optical head device, results similar to those obtained in Example 2 were obtained.

Example 4

A diffracting element 23 substantially similar to one shown in FIG. 4 was prepared by filling an isotropic diffraction grating 24 having a cross-sectional shape of saw-teeth shape with a birefringent filler 25.

In this case, liquid crystal having an ordinary refractive index $n_o$ of 1.52 and an extraordinary refractive index $n_e$ of 1.77 was used as the birefringent filler 25, and the isotropic diffraction grating 24 was formed directly on a glass substrate 20 having a refractive index $n_s$ of 1.59. Further, the grating depth d was set to be about 3.6 $\mu$m, and a light source having a wavelength $\lambda$ of 650 nm was used.

Of this diffracting element 23, the refractive index difference $\Delta n_1$ in B direction where the refractive index became highest was 1.77−1.59=0.18, and since the grating depth d was 3.6 $\mu$m and the wavelength $\lambda$ was 650 nm, the value of $\Delta n_1 \times d/\lambda$ was substantially 1.0, and with respect to the first-order diffraction efficiency to the polarized light in B direction, a value of substantially 95% which is the theoretical limit was obtained.

Further, of this diffracting element 23, the refractive index difference $\Delta n_2$ in A direction where the refractive index became lowest was 1.52−1.59=−0.07, and since the grating depth d was 3.6 $\mu$m and the wavelength $\lambda$ was 650 nm, the value of $\Delta n_2 \times d/\lambda$ was substantially 0.39, and the zero-order transmittance efficiency was substantially 58%, and the first-order diffraction efficiency was substantially 22%, to the polarized light in A direction.

The above-mentioned diffracting element was incorporated with an optical head device. In a case of an optical disk having substantially no birefringence, the emitted light polarized in A direction was transmitted through the diffracting element 23 with a zero-order transmittance efficiency of 58%, converted to circularly polarized light with a quarter-wave plate, reflected from the optical disk, converted to polarized light in B direction with the quarter-wave plate again, then diffracted by the diffracting element 23 with a first-order diffraction efficiency of 95%, and reached a light-receiving element. The go and return efficiency at this time was 58%×95%≈55%. Here, this value is a calculated value presuming that there was no aperture limit by the diameter of an objective lens, reflection loss of the disk or the like.

Further, presuming that the optical disk had a high birefringence, the go and return efficiency where the polarization direction in returning path was the A direction which was the same as in going path, was studied, whereupon it was 58%×22%≈13%.

The present invention is by no means restricted to the above-mentioned embodiments. Various modifications may be added within the range not depart from the gist of the present invention.

INDUSTRIAL APPLICABILITY

By employing the production process of the present invention, the liquid crystal material is aligned well and stably, the thickness of the film of polymer liquid crystal produced can be made uniform, and the refractive index is stable and high.

Accordingly, the diffracting element has such characteristics that the diffraction efficiency is high, and the diffraction efficiency is uniformed in the plane. Further, the production yield of the diffracting element can be improved.

According to the diffracting element and the optical head device of the present invention, an excellent effect can be obtained that information can be read out even from an optical recording medium having birefringence. Further, the device will have a high light utilization efficiency and a stable diffraction efficiency.

What is claimed is:

1. A diffracting element comprising:
    a diffraction grating having a cross-sectional shape including projections and recesses, said projections being formed with an optical material and at least said recesses being filled with another optical material;
    one of the optical materials showing a birefringence due to an extraordinary refractive index, and the other of the optical materials comprising an isotropic optical material;
    said isotropic optical material having at least one refractive index which is different from both an ordinary refractive index of the optical material showing said birefringence and the extraordinary refractive index; and
    said diffracting element having a first order diffraction-efficiency for polarized light exiting through the diffraction grating which is at least 10% of a first order diffraction-efficiency for polarized light returning through the diffraction grating.

2. The diffracting element according to claim 1, wherein the refractive index of the isotropic optical material is smaller than the smaller one of the ordinary refractive index and the extraordinary refractive index of the birefringent optical material, or larger than the larger one of these indices.

3. The diffracting element according to claim 1, which uses two types of optical materials having such a difference in refractive index that the first-order diffraction efficiency to the polarization direction where the diffraction efficiency becomes lowest, is at least 10% of the first-order diffraction efficiency to the polarization direction where the diffraction efficiency becomes highest, and the product of the zero-order transmittance efficiency to the polarization direction where the diffraction efficiency becomes lowest, and the first-order diffraction efficiency to the polarization direction where the diffraction efficiency becomes highest, is at least 10%.

4. The diffracting element according to claim 1, wherein the cross-sectional shape of projections and recesses is bilaterally asymmetric saw-tooth shape.

5. The diffracting element according to claim 1, wherein the diffraction grating is formed on a glass substrate.

6. The diffracting element according to claim 1, which has a quarter-wave plate integrated therewith.

7. The diffracting element according to claim 1, wherein the optical material showing birefringence is polymer liquid crystal.

8. The diffracting element according to claim 7, wherein the refractive index of the isotropic optical material is smaller than the smaller one of the ordinary refractive index and the extraordinary refractive index of the polymer liquid crystal.

9. A process for producing a diffracting element having a grating having a cross-sectional shape including projections and recesses formed on a thin film of a polymer liquid crystal, and having said grating filled with an isotropic medium, said process comprising:
    applying an alignment treatment to a facing surface of at least one of two substrates facing each other;
    sandwiching spacers and a liquid crystal to be a thin film of the polymer liquid crystal between the substrates facing each other and having the liquid crystal aligned and cured to obtain the thin film of the polymer liquid crystal; and
    taking at least one substrate off to form said grating; and
    filling at least the recesses with an isotropic medium to form the diffracting element.

10. The process for producing a diffraction grating according to claim 9, which comprises applying release treatment to the facing surface of at least one of the substrates, after the alignment treatment is applied to the two substrates facing each other.

11. The process for producing a diffracting element according to claim 10, wherein the refractive index of the isotropic medium to be filled in the grating having a shape of projections and recesses on the thin film of polymer liquid crystal, is different from both the ordinary refractive index and the extraordinary refractive index of the thin film of polymer liquid crystal.

12. An optical head device comprising:
    a light source;
    an objective lens configured to converge light from the light source on an optical recording medium;
    a diffracting element as defined in claim 1 and configured to transmit emitted light from the light source therethrough and change a traveling direction of reflected light reflected and coming back from the optical recording medium; and
    a photodetector configured to detect information of the reflected light having the traveling direction changed by the diffracting element,
    wherein the diffracting element is disposed between the light source and, the objective lens.

13. The optical head device according to claim 12, wherein the diffracting element used is such that the refractive index of the isotropic optical material is smaller than the smaller one of the ordinary refractive index and the extraordinary refractive index of the birefringent optical material, or larger than the larger one of these indices.

14. The optical head device according to claim 12, wherein the diffracting element used is such that two types of optical materials having such a difference in refractive index that the first-order diffraction efficiency to the polarization direction where the diffraction efficiency becomes lowest, is at least 10% of the first-order diffraction efficiency to the polarization direction where the diffraction efficiency becomes highest, and the product of the zero-order transmittance efficiency to the polarization direction where the diffraction efficiency becomes lowest, and the first-order diffraction efficiency to the polarization direction where the diffraction efficiency becomes highest, is at least 10%, are used.

15. A process for producing an optical head device comprising a diffracting element for changing a traveling direction of reflected light reflected and coming back from an optical recording medium, said process comprising:

applying an alignment treatment to a facing surface of at least one of two substrates facing each other;

sandwiching spacers and a liquid crystal to be a thin film of a polymer liquid crystal between the substrates facing each other and having the liquid crystal aligned and cured to obtain the thin film of polymer liquid crystal; and taking at least one substrate off to form a grating having a cross-sectional shape with projections and recesses on the thin film of polymer liquid crystal; and filling at least the recesses with an isotropic medium to form the diffracting element.

16. The process for producing an optical head device according to claim 15, wherein in the production of the diffracting element, release treatment is applied to the facing surface of at least one substrate after the alignment treatment is applied to the two substrates facing each other, and the substrate having the release treatment applied thereto is taken off after the liquid crystal is cured.

* * * * *